United States Patent
Ashworth

(10) Patent No.: US 11,288,896 B2
(45) Date of Patent: Mar. 29, 2022

(54) METHOD FOR UNIQUELY IDENTIFYING MAILPIECES HAVING NON-PERSONALIZED ENCLOSURES

(71) Applicant: QUADIENT TECHNOLOGIES FRANCE, Bagneux (FR)

(72) Inventor: Peter Ashworth, London (GB)

(73) Assignee: Quadient Technologies France, Bagneux (FR)

( * ) Notice: Subject to any disclaimer, the term of this patent is extended or adjusted under 35 U.S.C. 154(b) by 414 days.

(21) Appl. No.: 16/051,080

(22) Filed: Jul. 31, 2018

(65) Prior Publication Data

US 2019/0066393 A1 Feb. 28, 2019

(30) Foreign Application Priority Data

Aug. 30, 2017 (EP) ..................... 17306112

(51) Int. Cl.
*G07B 17/00* (2006.01)
*G06Q 50/32* (2012.01)
*G06F 3/12* (2006.01)

(52) U.S. Cl.
CPC ..... *G07B 17/00435* (2013.01); *G06F 3/1201* (2013.01); *G06F 3/121* (2013.01);
(Continued)

(58) Field of Classification Search
CPC .... G07B 17/00435; G07B 2017/00338; G07B 17/00314; G07B 17/00661
(Continued)

(56) References Cited

U.S. PATENT DOCUMENTS

| 8,856,046 B1 | 10/2014 | Ifferte et al. |
| 2002/0143880 A1 * | 10/2002 | Sansone ........... G07B 17/00016 709/206 |

(Continued)

FOREIGN PATENT DOCUMENTS

| EP | 0804974 A1 | 11/1997 | |
| EP | 1953705 A2 * | 8/2008 | ............. G06F 3/126 |

(Continued)

OTHER PUBLICATIONS

"Asynchronous Printer Cache," Nov. 2, 2011, IP.com Prior Art Database. pp. 1-2. (Year: 2011).*

(Continued)

*Primary Examiner* — Jeff Zimmerman
*Assistant Examiner* — Hunter A Molnar
(74) *Attorney, Agent, or Firm* — Cozen O'Connor

(57) ABSTRACT

A method for uniquely identifying mailpieces having non-personalized enclosures during an inserting and printing process in a mailpieces production system, the method including: creating a Job file containing at least a mailing list of addresses to be printed on mailpieces, allocating a distinct mailpiece identifier for a mailpiece, allocating a temporary machine identifier to a non-personalized enclosure extracted from an insert feeder of the mailpiece production system, associating said temporary machine identifier with said distinct mailpiece identifier and recording the mailpiece identifier as being in process, creating the mailpiece by inserting at least the non-personalized enclosure into an envelope, printing on the envelope an address associated with the mailpiece identifier, and recording the mailpiece identifier as being inserted.

20 Claims, 3 Drawing Sheets

(52) U.S. Cl.
CPC ........... *G06F 3/1273* (2013.01); *G06Q 50/32* (2013.01); *G07B 17/00314* (2013.01); *G07B 17/00508* (2013.01); *G07B 17/00661* (2013.01); *G07B 2017/00338* (2013.01); *G07B 2017/00717* (2013.01); *G07B 2017/00725* (2013.01)

(58) Field of Classification Search
USPC ......................................................... 705/406
See application file for complete search history.

(56) References Cited

U.S. PATENT DOCUMENTS

| | | | | |
|---|---|---|---|---|
| 2006/0167584 | A1* | 7/2006 | Wiersma | G07B 17/00467 700/221 |
| 2006/0244999 | A1* | 11/2006 | Kovlakas | G07B 17/00508 358/1.16 |
| 2006/0284360 | A1* | 12/2006 | Hume | B42C 1/10 270/1.02 |
| 2009/0070278 | A1* | 3/2009 | Rosen | G07B 17/00362 705/407 |
| 2009/0307079 | A1* | 12/2009 | Martin, Jr. | G06Q 30/0601 705/14.36 |
| 2011/0231008 | A1* | 9/2011 | McIntee | G07B 17/00459 700/222 |
| 2012/0066060 | A1 | 3/2012 | Wilen | |
| 2014/0049795 | A1* | 2/2014 | Arpino | G06Q 10/06 358/1.15 |
| 2016/0031578 | A1* | 2/2016 | Fujimoto | G06F 3/1234 53/64 |

FOREIGN PATENT DOCUMENTS

| | | |
|---|---|---|
| EP | 1986160 A2 | 10/2008 |
| GB | 2535704 A | 8/2016 |
| WO | 00/25200 A1 | 5/2000 |
| WO | 2004/089646 A1 | 10/2004 |

OTHER PUBLICATIONS

European Search Report, dated Nov. 6, 2017, for EP 17306112, 2 pages.

* cited by examiner

METHOD FOR UNIQUELY IDENTIFYING MAILPIECES HAVING NON-PERSONALIZED ENCLOSURES

TECHNICAL FIELD

The present invention relates to mail processing machines, and notably to improvements in mailpieces production systems comprising inserters, inserts and envelope printers. More particularly, the present invention concerns a method for uniquely identifying mailpieces having identical and non-personalized enclosures during an inserting and printing process in such mailpieces production systems.

BACKGROUND

Despite a noticeable decrease in printed correspondence since the advent of Internet, physical mail remains a preferred and efficient communication channel for many customer segments. Letters have undoubtedly more substance than emails and a higher propensity to capture and retain customer attention. Modern output management technology allows the generation of highly personalized documents, but also to make them more interactive thanks to specific machine-readable symbols (e.g., one-dimensional barcode symbols, two-dimensional area or matrix code symbols), which behave as hyperlinks on paper. Other machine-readable symbols (e.g., one-dimensional barcode symbols, two-dimensional area or matrix code symbols) representing control codes and/or mailpiece identifiers can be added to printed documents to drive mail processing machines in accordance with the exact composition of each mailpieces.

There are indeed several modes of operating an inserter. In the simplest one, job parameters are fixed and the same tasks are performed on all mailpieces. In a more elaborated mode, corresponding to an open loop production system, each mailpiece bears control codes that are read and interpreted by the inserter (e.g., for adding more pages or inserts). In the most sophisticated (data driven) mode, corresponding to a close loop production system, the mailpiece bears a unique identifier that points to a database where the finishing instructions for that particular mailpiece are recorded.

In the close loop production system, the production software generates a file containing finishing instructions about each mailpiece that are to be printed. As mailpieces enter a processing equipment such as a folder/inserter, their identifiers are scanned, finishing instructions are looked-up in the file and executed. Finishing instructions are typically related to inserts to be added into, addresses or messages to be printed onto the envelopes, or specific sorting conditions. Events linked to a particular mailpiece can be recorded. Mailpieces may also be scanned at the exit of the machine for integrity purposes. Closed loop systems typically require near real-time communication between the equipment performing the work and the computer systems managing the process.

Adversely, in the open loop production system, the production software prints a batch of mailpieces but does not generate a file containing finishing instructions. The finishing instructions are rather included in a machine-readable symbols (e.g., one-dimensional barcode symbol, two-dimensional area or matrix code symbol) which is printed on the mailpiece and can be interpreted directly by the machine. Although they do not require real-time communication and are thus simpler to implement, open loop systems offer much less possibilities in mailpiece customization and have the inherent disadvantages of not providing integrity.

Despite the sophistication of modern output management technology, a fair percentage of customer communication is still made of simple enclosures, like invitations or coupons, and without accompanying letters. Such enclosures may not be personalized at all. Admittedly, an identifier may be printed thereon, but in many cases the inserts are pre-printed and there is no way of uniquely identifying them. The recipient address must thus be printed on the envelope, according to a mailing list.

However, it might be desirable to record which enclosure has been sent to a given customer. The enclosures may be for instance coupons of free tickets bearing a promotional code that is to be entered on a Web page or presented in a shop counter, and the merchant wants to make sure that the customer is entitled to use it. Or the enclosure may be an invitation to an event, and the sender wants to record which customers have attended it. It is therefore interesting to provide a method allowing to match enclosures with customers, and also to ensure that enclosures have been sent to all recipients.

Many methods exist for ensuring a perfect match between documents sent to customers, enclosures and envelopes. These methods generally require a high level of integration between printing and inserting operations.

For instance in U.S. Pat. No. 5,519,624, main documents are fed, on which processing instructions are represented in the form of a barcode which is optically scanned. Printing instructions for the printing of enclosures are stored in a memory. In reaction to an enclosure code forming part of the processing instructions an enclosure is printed and added to the main document. By printing the enclosures in reaction to enclosure codes associated with the main documents, a wide variety of enclosures can be incorporated into items to be mailed without logistic problems. The processing instructions can of course contain other codes as well, for instance, regarding whether or not the main document and any enclosure documents are to be folded, feeding pre-printed enclosure documents in known manner, the choice of a type of envelope in which the documents are to be packaged and the printing of an address on the envelope prior or subsequent to the packaging of the documents.

In U.S. Pat. No. 5,798,930, a method for processing sheets in a processing apparatus is disclosed; comprising a plurality of processing stations and a control system controlling at least one processing station for printing sheets and/or assembling sheets to form documents to be mailed. Digital document including a digital code are generated. This code comprises information about the manner to control the processing stations. The code may comprise, for instance, information about the way in which sheets are folded, enclosures are added, the number of sheets to be inserted in an envelope and how filled envelopes are to be sorted. It is even possible that a part of the sheets or all sheets are pre-printed, so that the digital document comprises exclusively digital codes.

In most of these methods, sets of printing instructions are associated with sets of processing instructions in advance of the inserting process in the output management system. Such prior association is not required for mail batches composed of pre-printed enclosures which are supplied in bulk, with or without identifiers, and only the recipient address is to be printed on the envelope. On the other hand, address printers alone do not have the capacity of recording the mailpieces that have been mailed for integrity purposes, or of associating an enclosure identifier with an address printed on an envelope according to a mailing list.

SUMMARY

Some implementations may be summarized as a method and apparatus for uniquely identifying and tracking mailpieces containing pre-printed enclosures, with or without identifiers, during the inserting and printing process.

Some implementations may be summarized as a method and apparatus for associating an enclosure with a mailpiece having an address printed on an envelope according to a mailing list.

Some implementations may be summarized as a method and apparatus for associating an enclosure with a mailpiece having an address printed on an envelope, wherein an insert identifier is captured on the enclosure before it is inserted into the envelope.

Some implementations may be summarized as a method and apparatus for associating an enclosure with a mailpiece having an address printed on an envelope, wherein an insert identifier is dynamically printed on the enclosure before it is inserted into the envelope.

Some implementations may be summarized as a method and apparatus for associating an enclosure with a mailpiece having an address printed on an envelope, wherein a customized message is dynamically printed on the enclosure before it is inserted into the envelope.

Some implementations may be summarized as a method and apparatus by which the integrity of a batch can be tracked, information about the processing of mailpieces can be recorded, and each misprocessed mailpiece can be regenerated.

Some implementations may be summarized as a method and apparatus for generating job reports and statistics applying to bulk mailing of non-personalized enclosures.

Some implementations may be summarized as a method and a system for producing large mail batches, and specifically for the printing of variable data on envelopes having the same content or similar content, or otherwise non-personalized enclosures.

Some implementations may be summarized as a method and apparatus for uniquely identifying mailpieces having non-personalized enclosures during an inserting and printing process in a mailpieces production system, the method comprising:

receiving, accessing or even creating a Job file containing at least a mailing list of addresses to be printed on mailpieces, allocating a distinct mailpiece identifier for a mailpiece, allocating a temporary machine identifier to a non-personalized enclosure extracted from an insert feeder of the mailpiece production system, associating said temporary machine identifier with said distinct mailpiece identifier and recording the mailpiece identifier as being in process, creating the mailpiece by inserting at least the non-personalized enclosure into an envelope, printing on the envelope an address associated with the mailpiece identifier, and recording the mailpiece identifier as being inserted.

Preferably, the method further includes capturing an insert identifier on the enclosure and associating it with the temporary machine identifier allocated to the non-personalized enclosure.

Alternatively, the method further includes printing an insert identifier on the enclosure and associating it with the temporary machine identifier allocated to the non-personalized enclosure.

In one embodiment, the insert identifier is equal or derived from the temporary machine identifier.

In another embodiment, the insert identifier is created according to predetermined instructions contained in the Job file.

Advantageously, the method further includes printing a customized message on the non-personalized enclosure before it is inserted into the envelope.

Advantageously, the method includes adding a document such as a standard letter to the enclosure and inserting said document in the envelope.

Advantageously, the method further includes printing on the envelope other data corresponding to the mailpiece identifier along with the address.

Preferably, the method includes tracking the status of each mailpiece with the temporary machine identifier during the inserting, printing and stacking process, recording all failed mailpiece identifiers and regenerating the corresponding mailpieces until a whole job is complete.

Advantageously, the method includes capturing an image of the mailpiece after printing of the address, to perform an image analysis and recording the mailpiece as failed if said image analysis detects a print defect.

Advantageously, the method further includes registering images of the mailpieces that have been successfully inserted, printed and stacked as a proof of completion of the job.

BRIEF DESCRIPTION OF THE DRAWINGS

Various embodiments or implementations of the invention will be described and explained with additional specificity and detail through the use of the accompanying drawings in which.

DETAILED DESCRIPTION OF EXEMPLARY EMBODIMENTS

Figure 1:
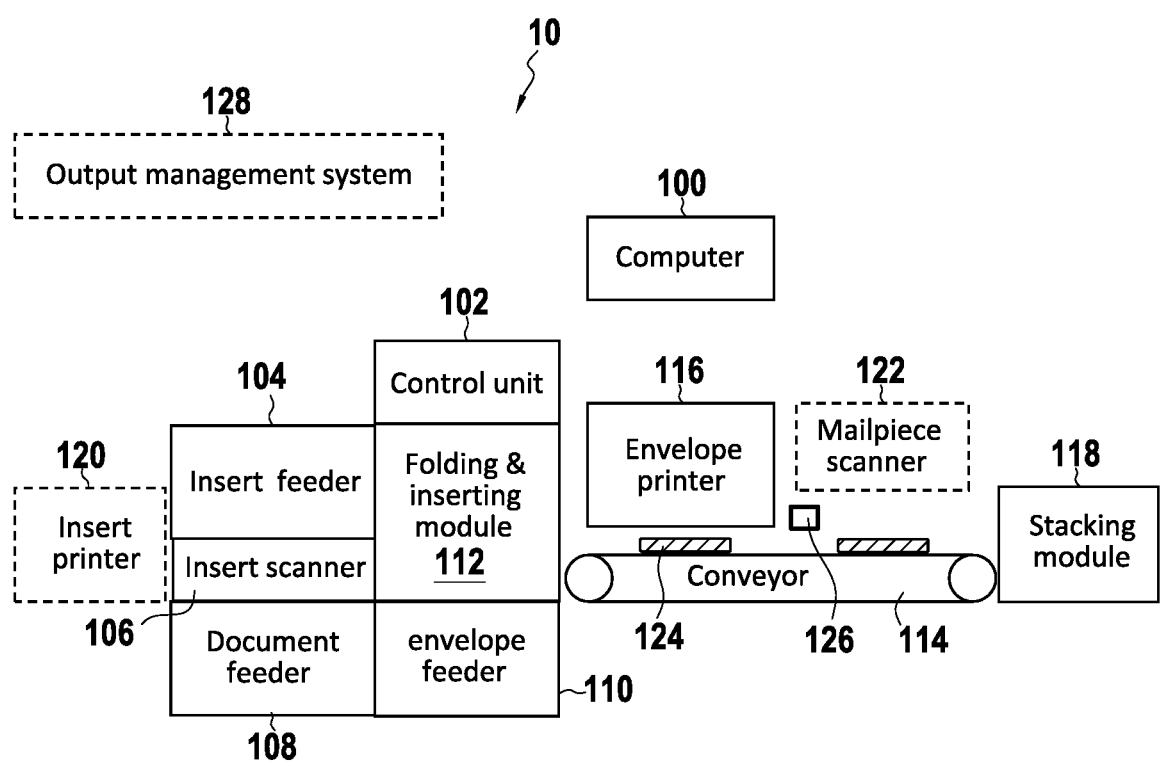
FIG. 1 is a general view of a mailpieces production system showing the various components and their interactions during the production process.

FIG. 1 is a general view of a mailpieces production system showing the various components and their interactions during the production process. The system 10 traditionally comprises a general purpose computer 100 and a control unit 102 for controlling several processing stations. The processing stations include an insert feeder 104, a scanner 106, a document feeder 108, an envelope feeder 110, a folding and inserting module 112, a conveyor 114, an envelope printer 116, and a stacking module 118. The stations may also include an optional insert printer 120 and an optional mailpiece scanner 122.

The system also includes a plurality of sensors for monitoring the movements of mailpieces 124 through the processing stations. Notably there is a sensor 126 located after the envelope printer 116 to inform the control unit 102 that a mailpiece 124 has passed this step of the production process.

The computer 100 may be in relation with an external output management system 128, from which a mailing list containing the recipient addresses to be printed on the envelopes, may be imported. The mailing list may also be supplied directly to the computer, and job reports and statistics generated by the computer sent to the output management system for consolidation with other data. It shall be noted that the output management system does not generate the processing instructions, which are rather defined at the control unit level. The output management system may also not exist at all, and the mailing list be generated by an enterprise application (not represented) from which customer data are extracted.

In operation, enclosures are extracted from the insert feeder 104 and directed to the folding and inserting module 112. The enclosures are preferably entirely pre-printed. An insert identifier may be pre-printed on each enclosure. This identifier is either always the same for the whole batch or unique to each enclosure. This insert identifier is scanned by the insert scanner 106 as the enclosures are extracted from the insert feeder 102.

Alternatively, the insert identifier may be printed on the enclosure by the optional insert printer 120. Again, this identifier is either always the same for the whole batch or unique to each enclosure. In this case the insert identifier doesn't need to be scanned, but the insert scanner is preferably included by default in the system. A customized message may also be printed by the optional insert printer.

Documents are extracted from the document feeder 108 and directed to the folding and inserting module 112. Adding a document to the enclosure is optional, but the document feeder is preferably included by default in the system. The documents can be for instance standard (non-personalized) letters accompanying the enclosures, which are neither personalized nor identified.

Envelopes are extracted from the envelope feeder 108 and directed to the folding and inserting module 112. These envelopes are preferably plain windowless envelopes on which the recipient address will be printed. The enclosures and optionally the standard letters are inserted into the envelopes to form the complete mailpieces 124. The mailpieces exit from the folding and inserting module 112 and are conveyed to the envelope printer 116, where the addresses coming from the mailing list are printed on the mailpieces.

Optionally, the mailpieces may be scanned by the mailpiece scanner 122 for integrity purposes, before being stacked in the stacking module 118. This second scanning operation is usually not required for integrity as the movements of the mailpieces are constantly monitored by the system sensors. However, it might be required to register images of the mailpieces to prove, for instance, that a particular mailpiece has been sent. Image analysis may also be performed to detect print defects.

Figure 2:
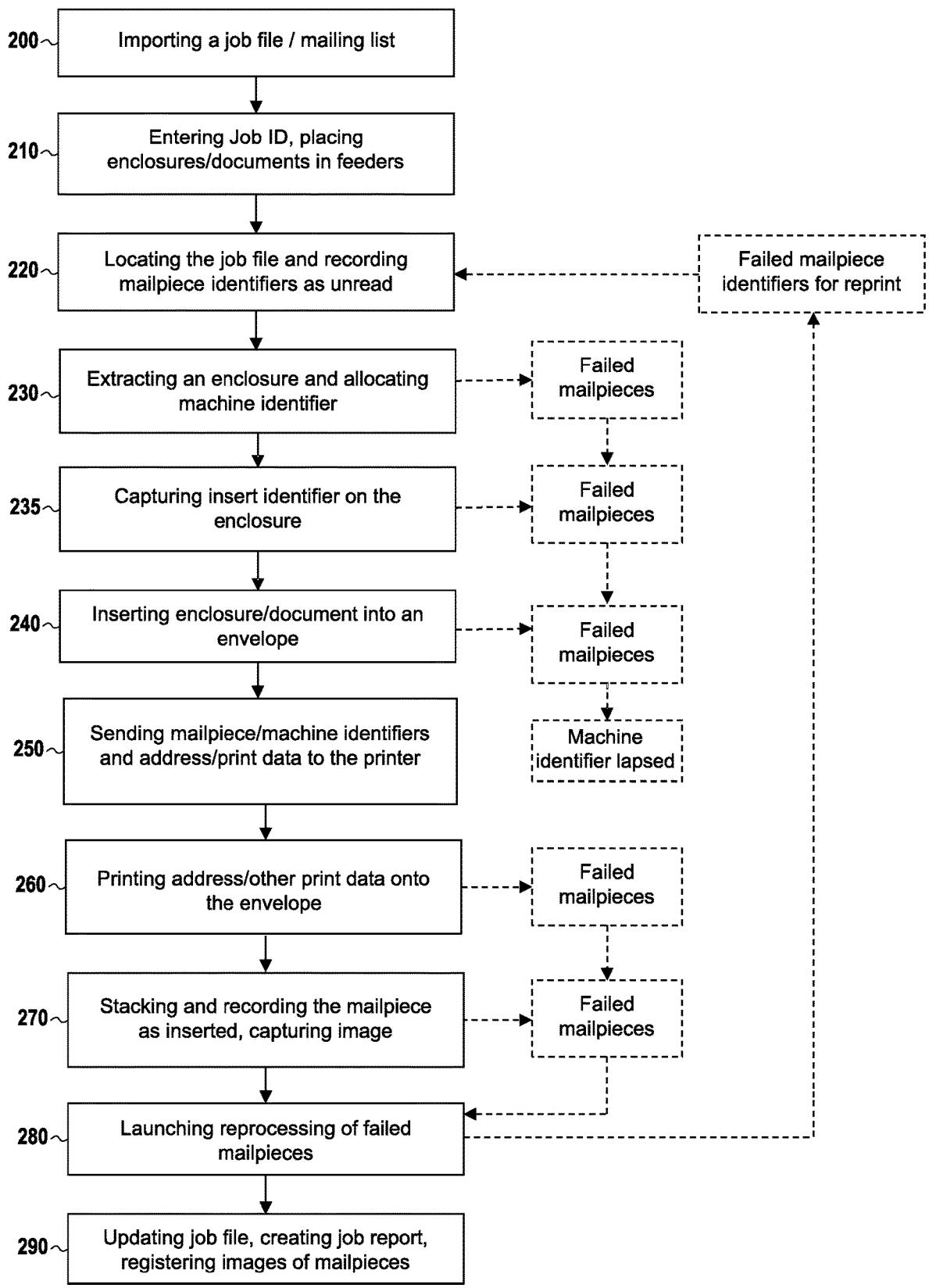
FIG. 2 is a flowchart showing the main operations of a method for practicing at least one implementation of the invention.

FIG. 2 is a flowchart showing the main operations or acts of a method for practicing at least one implementation of the invention.

At act 200 a job file is received, accessed, created or imported into the computer 100. A Job ID is contained either in the filename or in the body of the file. The job file is basically a mailing list containing lines of addresses that have to be printed on the mailpieces. This mailing list may have been generated by the output management system 128, or by an enterprise application from which customer data are extracted. Mailpiece identifiers are either contained in each line or blank. If blank, then mailpiece identifiers are added during the job file import.

At act 210, a Job ID is entered in the control unit 102 by an operator, either by typing or scanning it from a cover page. Enclosures and optionally documents are placed into their respective feeders 104, 108. The job parameters corresponding to the processing instructions are defined by the operator at the control unit. Otherwise, the operator can apply job parameters previously defined for another job.

At act 220, the control unit 102 connects to the computer 100 using the Job ID entered by the operator. The job file is located by the computer and all mailpiece identifiers are recorded as "Unread" in the job file. The control unit remains connected to the computer to exchange data about the status of mailpieces until the job is complete.

At act 230, an enclosure is extracted from the insert feeder 104 and a temporary machine identifier is allocated by the control unit 100. This temporary machine identifier is unique to a mailpiece within a job, and is mapped by the computer to the next available mailpiece identifier in the job file that is recorded as "Unread" or "Sent for Reprint". This mailpiece identifier is then recorded as "In Process".

If the enclosure bears a pre-printed identifier, this insert identifier is captured at act 235 by the insert scanner and recorded by the control unit with the corresponding temporary machine identifier.

At act 240, a complete mailpiece 124 is created in the folding and inserting module 112 by inserting the enclosure and optionally a document into an envelope. The computer 100 uses the temporary machine identifier sent from the control unit 102 to map to the same mailpiece identifier as before.

At act 250, the computer 100 locates the addressing and other print data for this mailpiece identifier, and sends it to the envelope printer 116 (along with the mailpiece identifier and the temporary machine identifier) in advance of the mailpiece arriving. The envelope printer 116 stores the mailpiece identifier and the print data in its memory.

At act 260, the complete mailpiece 124 is placed on the conveyor 114. The control unit 102 signals the arriving of a mailpiece to the envelope printer 116, referencing it using the temporary machine identifier. Addressing and other print data corresponding to that mailpiece/temporary machine identifier are printed on the envelope.

At act 270, the mailpiece is stacked with other complete mailpieces in the stacking module 118 and is recorded in the job file as "Inserted", using the mapping between temporary machine identifier and mailpiece identifier. If required, an image of the complete mailpiece 124 may be captured by the optional mailpiece scanner 122. Image analysis may be performed to detect print defects, or the image may be registered.

A mailpiece may crash during folding and inserting, printing or stacking operations. The operator will remove the enclosures, the envelope or the complete mailpiece, and restart the system. If the malfunction occurred before printing of the address, then the corresponding temporary machine identifier is lapsed. Addressing and other print data corresponding to the mailpiece identifier are printed on the next mailpiece arriving to the envelope printer 116 and associated with the next temporary machine identifier. If the malfunction occurred during printing operation, or in the stacking module 118, or if the optional mailpiece scanner 122 detects a print defect, the corresponding mailpiece identifier is recorded by the computer 100 as "Failed" in the job file.

At act 280, the operator launches the reprocessing of failed mailpieces, for instance by clicking a "Reprint" button on an interface of the computer 100. Then all mailpieces identifiers that have been recorded as "Failed" are recorded as "Sent for Reprint" and the mailpieces reprocessed until the whole job is completed. Otherwise, failed mailpieces identifiers remain as such in the job file.

At act 290, the job file is updated with the latest status of each mailpiece. A job report is created by the computer 100, containing the status of each mailpieces, their content with the corresponding insert identifiers, addressing and print data, job parameters, operator login and timing information. This report can be sent to the output management system 128. Images of the mailpieces that have been successfully inserted, printed and stacked can also be registered as a proof of the completion of the job.

Figure 3:
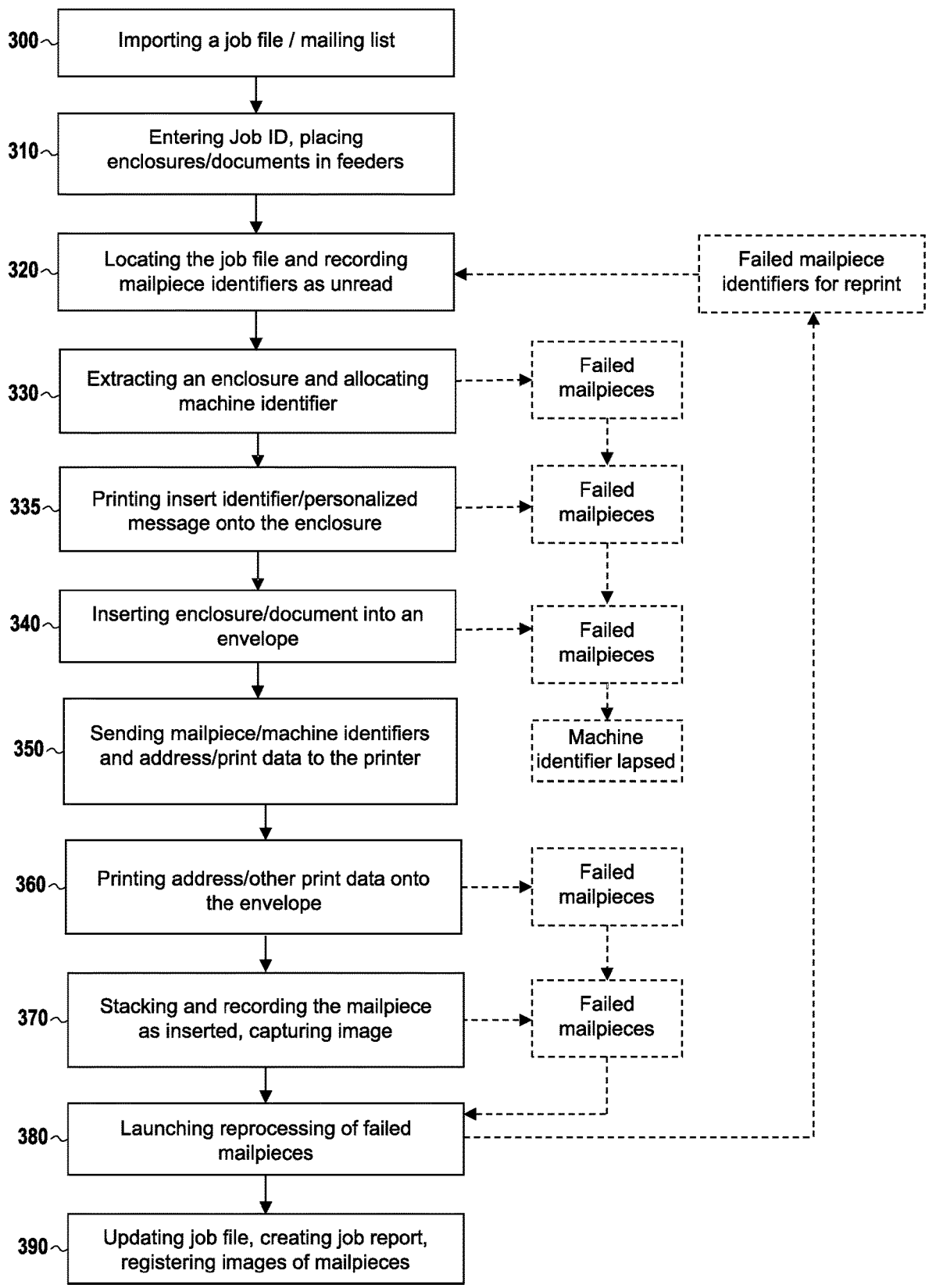
FIG. 3 is a flowchart showing an alternative method for practicing at least one implementation of the invention.

FIG. 3 is a flowchart showing an alternative method for practicing at least one implementation of the invention. In this alternative method, insert identifiers are overprinted with the optional insert printer instead of being scanned. Otherwise the operations or acts are very similar to the first one.

At act 300 a job file is imported into the computer 100. A Job ID is contained either in the filename or in the body of the file. The job file is basically a mailing list containing lines of addresses that have to be printed on the mailpieces. Mailpiece identifiers are either contained in each line or blank. If blank, then mailpiece identifiers are added during the job file import.

At act 310, a Job ID is entered in the control unit 102 by an operator, either by typing or scanning it from a cover page. Enclosures and optionally documents are placed into their respective feeders 104, 108. The job parameters corresponding to the processing instructions are defined by the operator at the control unit level. Otherwise, the operator can apply job parameters previously defined for another job.

At act 320, the control unit 102 connects to the computer 100 using the Job ID entered by the operator. The job file is located by the computer and all mailpiece identifiers are recorded as "Unread" in the job file. The control unit remains connected to the computer to exchange data about the status of mailpieces until the job is complete.

At act 330, an enclosure is extracted from the insert feeder 104 and a temporary machine identifier is allocated by the control unit 100. This temporary machine identifier is unique to a mailpiece within a job, and is mapped by the computer 100 to the next available mailpiece identifier in the job file that is recorded as "Unread" or "Sent for Reprint". This mailpiece identifier is then recorded as "In Process".

At act 335, an insert identifier is printed on the enclosure by the insert printer 120 and recorded by the control unit 100 with the corresponding temporary machine identifier. The insert identifier may be equal to or derived from the temporary machine identifier. Alternatively, the insert identifier may be created according to instructions contained in the job file. A customized message may also be printed by the optional insert printer 120.

At act 340, a complete mailpiece 124 is created in the folding and inserting module 112 by inserting the insert and optionally a document into an envelope. The computer 100 uses the machine identifier sent from the control unit 102 to map to the same mailpiece identifier as before.

At act 350, the computer 100 locates the addressing and other print data for this mailpiece identifier, and sends it to the printer 116 (along with the mailpiece identifier and the temporary machine identifier) in advance of the mailpiece arriving. The envelope printer 116 stores the mailpiece identifier and the print data in its memory.

At act 360, the complete mailpiece 124 is placed on the conveyor 114. The control unit 102 signals the arriving of a mailpiece to the envelope printer 116, referencing it using the temporary machine identifier. Addressing and other print data corresponding to that mailpiece/temporary machine identifier are printed on the envelope.

At act 370, the mailpiece is stacked with other complete mailpieces in the stacking module 118 and is recorded in the job file as "Inserted". If required, an image of the complete mailpiece 124 may be captured by the optional mailpiece scanner 122. Image analysis may be performed to detect print defects, or the image registered.

A mailpiece may crash during folding and inserting, printing or stacking operations. The operator will remove the enclosures, the envelope or the complete mailpiece, and restart the system. If the malfunction occurred before printing of the address, then the corresponding temporary machine identifier is lapsed. Addressing and other print data corresponding to the mailpiece identifier are printed on the next mailpiece arriving to the envelope printer 116 and associated with the next temporary machine identifier. If the malfunction occurred during printing operation, or in the stacking module 118, or if the optional mailpiece scanner 122 detects a print defect, the corresponding mailpiece identifier is recorded by the computer 100 as "Failed" in the job file.

At act 380, the operator launches the reprocessing of failed mailpieces, for instance by clicking a "Reprint" button on an interface of the computer 100. Then all mailpieces identifiers that have been recorded as "Failed" are recorded as "Sent for Reprint" and the mailpieces reprocessed until the whole job is completed. Otherwise, failed mailpieces identifiers remain as such in the job file.

At act 390, the job file is updated with the latest status of each mailpiece. A job report is created by the computer 100, containing the status of each mailpieces, their content with the corresponding insert identifiers, addressing and print data, job parameters, operator login and timing information. This report can be sent to the output management system 128. Images of the mailpieces that have been successfully inserted, printed and stacked can also be registered as a proof of the completion of the job.

It shall be noted that the machine identifier is only temporary and serves as long as the mailpiece is in process by the production system. This temporary machine identifier is unique to a mailpiece within a job, and might also be used to identify the failed mailpieces and their content, which are no longer associated with a valid mailpiece identifier, in the report.

Many variations of the system and methods described above are possible. For instance, the system may comprise more than one insert and/or document feeder. The computer and the control unit have been described as independent units, each running its own software, but their respective functions may be performed by a single unit.

The invention claimed is:

1. A method for associating an enclosure with a mailpiece during an inserting and printing process in a mailpieces production system, the method comprising:
providing a Job file containing at least a mailing list of addresses to be printed on mailpieces,
allocating a distinct mailpiece identifier for a mailpiece,
allocating a temporary machine identifier to the enclosure extracted from an insert feeder of the mailpiece production system, wherein the temporary machine identifier is only temporary and serves as long as the mailpiece is in process by the production system,
associating an insert identifier with said machine identifier allocated to the enclosure, associating said temporary machine identifier with said distinct mailpiece identifier and recording the mailpiece identifier as being in process, creating the mailpiece by inserting at least the enclosure into an envelope, printing on the envelope an address associated with the mailpiece identifier, recording the mailpiece identifier as being inserted, and wherein, in response to an occurrence of a malfunction before printing, causing the temporary machine identifier to lapse and causing the address corresponding to the mailpiece identifier to be printed on a next envelope and associated with a next temporary machine identifier that is different than the lapsed temporary machine identifier.

2. The method of claim 1, further comprising capturing the insert identifier on the enclosure.

3. The method of claim 1, further comprising printing the insert identifier on the enclosure.

4. The method of claim 3, wherein the insert identifier is equal or derived from the temporary machine identifier.

5. The method of claim 3, wherein the insert identifier is created according to predetermined instructions contained in the Job file.

6. The method of claim 1, further comprising printing a customized message on the enclosure before the enclosure is inserted into the envelope.

7. The method of claim 1, further comprising adding a document to the enclosure and inserting said document in the envelope.

8. The method of claim 1, further comprising printing on the envelope other data corresponding to the mailpiece identifier along with the address.

9. The method of claim 1, further comprising tracking the status of each mailpiece with the temporary machine identifier during the inserting, printing and stacking process, recording all failed mailpiece identifiers and regenerating the corresponding mailpieces until a whole job is complete.

10. The method of claim 1, further comprising capturing an image of the mailpiece after printing of the address, to perform an image analysis and recording the mailpiece as failed if said image analysis detects a print defect.

11. The method of claim 1, further comprising registering images of each of a plurality of mailpieces that have been successfully inserted, printed and stacked as a proof of completion of the job.

12. The method of claim 1, wherein the enclosure is an invitation or a coupon.

13. A mailpieces production system operable to associate an enclosure with a mailpiece during an inserting and printing process, the mailpieces production system comprising:

an insert printer;
an insert feeder;
a document feeder
an envelope feeder;
an envelope printer,
a computer comprising one or more processors, one or more non-transitory computer-readable media communicatively couple to the one or more processors, the one or more non-transitory computer-readable media which store at least one of computer-executable instructions or data which, when executed by the one or more processors cause the at least one or more processors to:
access a Job file containing at least a mailing list of addresses to be printed on mailpieces,
allocate a distinct mailpiece identifier for a mailpiece,
allocate a temporary machine identifier to the enclosure extracted from the insert feeder of the mailpiece production system, wherein the temporary machine identifier is only temporary and serves as long as the mailpiece is in process by the production system,
associate an insert identifier with said machine identifier allocated to the enclosure,
associate said temporary machine identifier with said distinct mailpiece identifier;
record the mailpiece identifier as being in process,
cause a creation of the mailpiece by insertion of at least the enclosure into an envelope,
cause an address associated with the mailpiece identifier to be printed on the envelope,
record the mailpiece identifier as being inserted, and
wherein, in response to an occurrence of a malfunction before printing, cause the temporary machine identifier to lapse and cause the address associated with the mailpiece identifier to be printed on a next envelope and associated with a next temporary machine identifier that is different than the lapsed temporary machine identifier.

14. The mailpieces production system of claim 13 wherein the at least one of computer-executable instructions or data when executed by the one or more processors cause the at least one or more processors to associate the insert identifier captured from the enclosure by an insert scanner with the temporary machine identifier allocated to the enclosure.

15. The mailpieces production system of claim 13 wherein the at least one of computer-executable instructions or data when executed by the one or more processors cause the at least one or more processors to associate the insert identifier printed on the enclosure by the insert printer with the temporary machine identifier allocated to the enclosure.

16. The mailpieces production system of claim 15 wherein the insert identifier is equal or derived from the temporary machine identifier.

17. The mailpieces production system of claim 15 wherein the at least one of computer-executable instructions or data when executed by the one or more processors cause the at least one or more processors further to create the insert identifier according to predetermined instructions contained in the Job file.

18. The mailpieces production system of claim 13 wherein the at least one of computer-executable instructions or data when executed by the one or more processors cause the at least one or more processors further to cause a customized message to be printed on the enclosure before the enclosure is inserted into the envelope.

19. The mailpieces production system of claim 13 wherein the at least one of computer-executable instructions or data when executed by the one or more processors cause the at least one or more processors further to cause a document to be added to the enclosure and cause an insertion of said document in the envelope.

20. The mailpieces production system of claim 13 wherein the at least one of computer-executable instructions or data when executed by the one or more processors cause the at least one or more processors further to cause other data corresponding to the mailpiece identifier along with the address to be printed on the envelope by the envelope printer.

* * * * *